United States Patent
Ha et al.

(10) Patent No.: US 12,542,310 B2
(45) Date of Patent: Feb. 3, 2026

(54) METHOD FOR RECOVERING ACTIVE METAL OF LITHIUM SECONDARY BATTERY

(71) Applicant: SK INNOVATION CO., LTD., Seoul (KR)

(72) Inventors: Hyeon Bae Ha, Daejeon (KR); Ji Min Kim, Daejeon (KR); Sung Real Son, Daejeon (KR); Hyeon Jung Kim, Daejeon (KR); Min Ji Sung, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 330 days.

(21) Appl. No.: 18/021,915

(22) PCT Filed: Aug. 11, 2021

(86) PCT No.: PCT/KR2021/010634
§ 371 (c)(1),
(2) Date: Feb. 17, 2023

(87) PCT Pub. No.: WO2022/039436
PCT Pub. Date: Feb. 24, 2022

(65) Prior Publication Data
US 2023/0307734 A1    Sep. 28, 2023

(30) Foreign Application Priority Data
Aug. 18, 2020   (KR) .......................... 10-2020-0103038

(51) Int. Cl.
*H01M 10/54* (2006.01)
*C01D 15/02* (2006.01)
(Continued)

(52) U.S. Cl.
CPC ............ *H01M 10/54* (2013.01); *C01D 15/02* (2013.01); *C22B 5/14* (2013.01); *C22B 7/006* (2013.01); *C22B 23/0407* (2013.01); *C22B 26/12* (2013.01)

(58) Field of Classification Search
CPC .... H01M 10/54; H01M 4/525; H01M 10/052; C01D 15/02; C22B 5/14; C22B 7/006;
(Continued)

(56) References Cited

U.S. PATENT DOCUMENTS 8,882,007 B1 * 11/2014 Smith ................... H01M 10/54
                                                                    241/23
2008/0050295 A1   2/2008 Uchida et al.
(Continued)

FOREIGN PATENT DOCUMENTS

CN    107017443 A    8/2017
EP    1 981 115 A1   10/2008
(Continued)

OTHER PUBLICATIONS

Raiguel et al., "Solvent Extraction of Gold (III) with Diethyl Carbonate," ACS Sustainable Chem. Eng. Aug. 13, 2020 (Year: 2020).*

(Continued)

*Primary Examiner* — Danielle M. Carda
(74) *Attorney, Agent, or Firm* — The PL Law Group, PLLC

(57) ABSTRACT

In a method for recovering an active metal of a lithium secondary battery, a preliminary cathode active material mixture is prepared from a cathode of a waste lithium secondary battery, the preliminary cathode active material mixture is fluidized through oxygen-containing gas within a fluidized bed reactor to form a cathode active material mixture, reductive gas is injected into the fluidized bed (Continued)

reactor to form a preliminary precursor mixture from the cathode active material mixture, and a lithium precursor is recovered from the preliminary precursor mixture.

18 Claims, 2 Drawing Sheets

(51) Int. Cl.
*C22B 3/00* (2006.01)
*C22B 5/14* (2006.01)
*C22B 7/00* (2006.01)
*C22B 26/12* (2006.01)

(58) Field of Classification Search
CPC ... C22B 23/0407; C22B 26/12; C22B 3/1608; C22B 7/001; C22B 7/005; C22B 23/021; C22B 23/043; C22B 47/00; C22B 7/00; C22B 23/00; Y02W 30/84; Y02P 10/20
USPC .......................................................... 75/743
See application file for complete search history.

(56) References Cited

U.S. PATENT DOCUMENTS

| | | | |
|---|---|---|---|
| 2009/0229413 | A1 | 9/2009 | Kakuta et al. |
| 2021/0028515 | A1* | 1/2021 | Na ..................... H01M 4/364 |
| 2021/0115532 | A1* | 4/2021 | La ..................... C01G 53/04 |

FOREIGN PATENT DOCUMENTS

| | | | | |
|---|---|---|---|---|
| EP | 4 105 177 | A1 | 12/2022 | |
| JP | 2000-348782 | A | 12/2000 | |
| JP | 2012229481 | A * | 11/2012 | ............ Y02W 30/84 |
| JP | 101897134 | B1 * | 9/2018 | ............ H01M 10/54 |
| KR | 10-2011-0065157 | A | 6/2011 | |
| KR | 10-2015-0002963 | A | 1/2015 | |
| KR | 10-1808121 | B1 | 12/2017 | |
| KR | 10-1897134 | B1 | 9/2018 | |
| KR | 10-2020238 | B1 | 9/2019 | |
| KR | 10-2019-0143088 | A | 12/2019 | |
| KR | 10-2020-0052735 | A | 5/2020 | |
| KR | 10-2020-0114048 | A | 10/2020 | |
| WO | WO 2007/088617 | A1 | 8/2007 | |
| WO | WO-2019199014 | A1 * | 10/2019 | ............ C01D 15/02 |

OTHER PUBLICATIONS

JP2012229481A Translation (Year: 2012).*
European Search Report For 21858523.0 issued on Feb. 13, 2025 from European patent office in a counterpart European patent application.
Brian Makuza et al. "Pyrometallurgical options for recycling spent lithium-ion batteries: A comprehensive review", Journal of Power Sources, vol. 491, 229622, 2021.
International Search Report for PCT/KR2021/010634 mailed on Nov. 30, 2021.
Office action issued on May 13, 2025 from Japan Intellectual Property Office in a counterpart Japanese Patent Application No. 2023-512038 (all the cited references are listed in this IDS.) (English translation is also submitted herewith.).
Notice of allowance issued on Jul. 1, 2025 from Korean Patent Office in a counterpart Korean Patent Application No. 10-2020-0103038 (all the cited references are listed in this IDS.) (English translation is also submitted herewith.).
Office action issued on Oct. 11, 2025 from China Patent Office in a counterpart China Patent Application No. 202180050973.4 (English translation is also submitted herewith.).

* cited by examiner

METHOD FOR RECOVERING ACTIVE METAL OF LITHIUM SECONDARY BATTERY

CROSS REFERENCE TO RELATED APPLICATIONS AND CLAIM OF PRIORITY

This application claims benefit under 35 U.S.C. 119, 120, 121, or 365(c), and is a National Stage entry from International Application No. PCT/KR2021/010634 filed on Aug. 11, 2021, which claims priority to the benefit of Korean Patent Application No. 10-2020-0103038 filed in the Korean Intellectual Property Office on Aug. 18, 2020, the entire contents of which are incorporated herein by reference.

BACKGROUND

1. Technical Field

The present invention relates to a method for recovering an active metal of a lithium secondary battery. More particularly, the present invention relates to a method for recovering an active metal from a waste cathode of a lithium secondary battery.

2. Background Art

A secondary battery which can be charged and discharged repeatedly has been widely employed as a power source of a mobile electronic device such as a camcorder, a mobile phone, a laptop computer, etc., according to developments of information and display technologies. The secondary battery includes, e.g., a lithium secondary battery, a nickel-cadmium battery, a nickel-hydrogen battery, etc. The lithium secondary battery is actively developed and applied due to high operational voltage and energy density per unit weight, a high charging rate, a compact dimension, etc.

The lithium secondary battery may include an electrode assembly including a cathode, an anode and a separation layer (separator), and an electrolyte immersing the electrode assembly. The lithium secondary battery may further include an outer case having, e.g., a pouch shape for accommodating the electrode assembly and the electrolyte.

A lithium metal oxide may be used as a cathode active material for the lithium secondary battery. The lithium metal oxide may further contain a transition metal such as nickel, cobalt, manganese, etc.

The lithium metal oxide as the cathode active material may be prepared by reacting a lithium precursor and a nickel-cobalt-manganese (NCM) precursor containing nickel, cobalt and manganese.

As the above-mentioned high-cost valuable metals are used for the cathode active material, an excessive cost is required for manufacturing the cathode material. Additionally, as environment protection issues have recently been highlighted, a recycling method of the cathode active material is being researched. For the recycle of the cathode active material, a regeneration of the lithium precursor with high efficiency and purity is needed.

SUMMARY

According to an aspect of the present invention, there is provided a method for recovering an active metal of a lithium secondary battery with high efficiency and high purity.

In a method for recovering an active metal of a lithium secondary battery according to embodiments of the present invention, a preliminary cathode active material mixture is prepared from a cathode of a waste lithium secondary battery. The preliminary cathode active material mixture is fluidized by an oxygen-containing gas in a fluidized bed reactor to form a cathode active material mixture. A preliminary precursor mixture is formed from the cathode active material mixture by injecting a reductive gas into the fluidized bed reactor. A lithium precursor is recovered from the preliminary precursor mixture.

In some embodiments, the cathode may include a cathode current collector; and a cathode active material layer formed on the cathode current collector and including a binder, a conductive material and a cathode active material. Preparing the preliminary cathode active material mixture may include removing the cathode current collector from the cathode. The preliminary cathode active material mixture may include the binder, the conductive material and the cathode active material.

In some embodiments, fluidizing the preliminary cathode active material mixture by the oxygen-containing gas may include decomposing or combusting the binder and the conductive material in the fluidized bed reactor.

In some embodiments, the oxygen-containing gas may include oxygen ($O_2$) and a non-reactive gas. The non-reactive gas may include at least one selected from the group consisting of helium (He), nitrogen ($N_2$), neon (Ne), argon (Ar), krypton (Kr) and xenon (Xe).

In some embodiments, a volume ratio of oxygen may be in a range from 10 to 30 vol %, and a volume ratio of the non-reactive gas may be in a range from 70 to 90 vol % based on a total volume of the oxygen-containing.

In some embodiments, fluidizing the preliminary cathode active material mixture by the oxygen-containing gas may be performed at a temperature from 100 to 600° C.

In some embodiments, fluidizing the preliminary cathode active material mixture by the oxygen-containing gas may include heating from a temperature less than 50° C. to a target temperature in a range from 400 to 600° C. range for 1 to 2 hours.

In some embodiments, fluidizing the preliminary cathode active material mixture by the oxygen-containing gas comprises a heat treatment at the target temperature for 2 to 5 hours.

In some embodiments, the reductive gas may contain hydrogen.

In some embodiments, forming the preliminary precursor mixture may be performed at a temperature in a range from 400 to 500° C.

In some embodiments, fluidizing the preliminary cathode active material mixture by the oxygen-containing gas and forming the preliminary precursor mixture may be continuously performed in-situ in the fluidized bed reactor.

In some embodiments, the preliminary precursor mixture may include preliminary lithium precursor particles and transition metal-containing particles. The transition metal-containing particles may include Ni, Co, NiO, CoO and MnO.

In some embodiments, the preliminary lithium precursor particles may include at least one of lithium hydroxide, lithium oxide and lithium carbonate.

In some embodiments, recovering the lithium precursor may include collecting the lithium hydroxide by washing the preliminary lithium precursor particles with water.

According to the above-described exemplary embodiments, a lithium precursor may be recovered from a cathode active material of a waste lithium secondary battery through a fluidization process in which an oxygen-containing gas is introduced to decompose and combust a binder and a conductive material, and a hydrogen reductive process. Thus, a particle aggregation caused by a side reaction (e.g., an excessive reduction of lithium) caused by decomposition heat generated when the binder is decomposed and a combustion heat generated when the conductive material combusts may be minimized.

Further, the conductive material may react with oxygen included in the oxygen-containing gas to be combusted, so that generation of carbon-based by-products (e.g., lithium carbonate) derived from the conductive material may be prevented. Accordingly, a recovery ratio of the desired lithium precursor may be increased, and a subsequent process for removing the by-products may not be required so that process productivity and long-term operability may be improved.

BRIEF DESCRIPTIONS OF THE DRAWINGS

DETAILED DESCRIPTION

Figure 1:
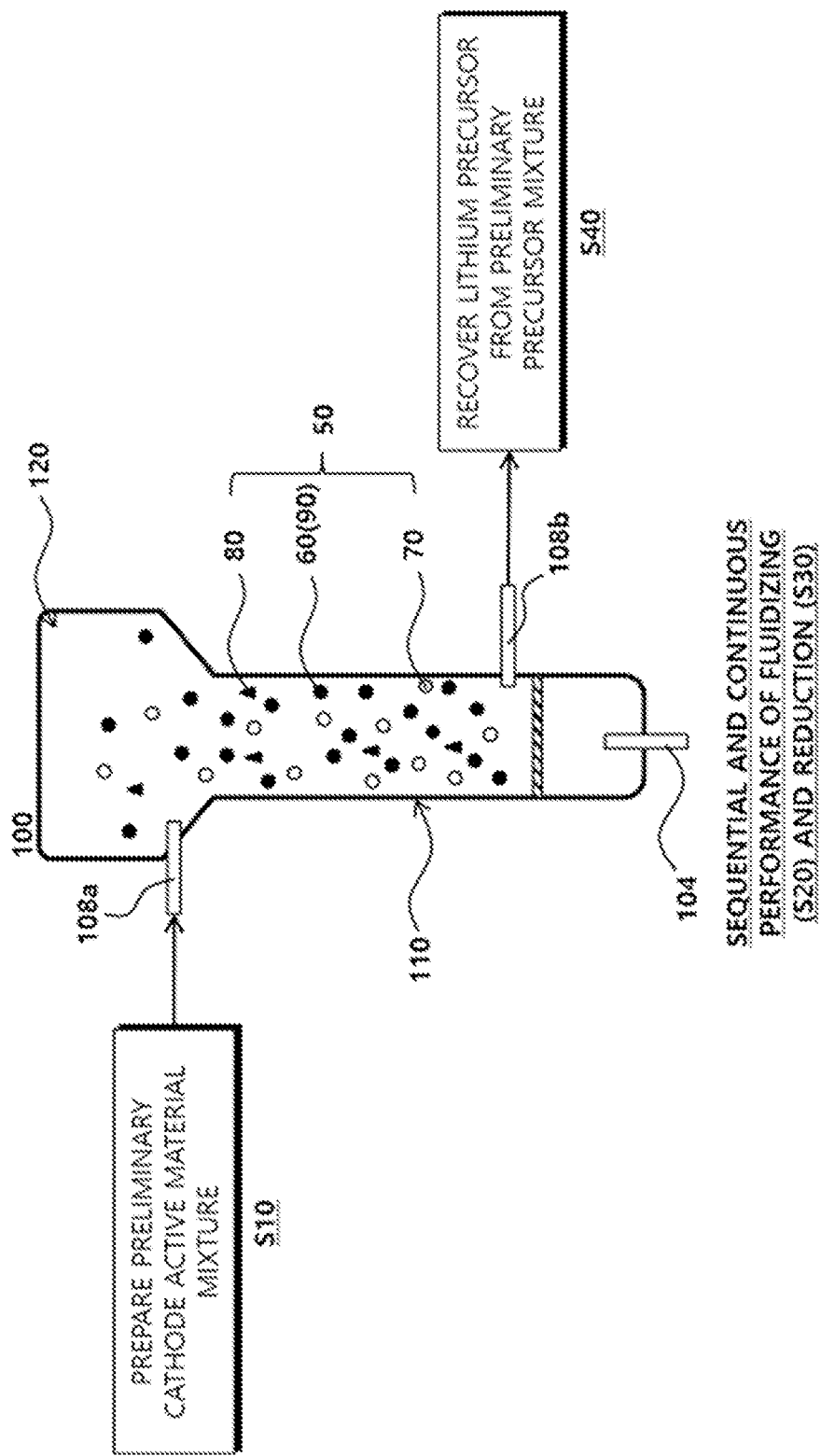
FIG. 1 is a schematic flow diagram for describing a method for recovering an active metal of a lithium secondary battery in accordance with exemplary embodiments.

One or more embodiments of the present invention provide a high-purity, high-yield method for recovering an active metal from a lithium secondary battery of a waste lithium secondary battery.

Hereinafter, embodiments of the present invention will be described in detail. However, since the present invention may be subject to various modification and may have various forms, specific embodiments are illustrated in the drawings and described in detail in the text. However, this is not intended to limit the present invention to the specific form disclosed herein, and should be understood to include all modifications, equivalents, or substitutes included in the spirit and scope of the present invention.

Unless defined otherwise, all terms used herein, including technical or scientific terms, have the same meaning as commonly understood by one of ordinary skill in the art to which the present invention belongs. Terms such as those defined in commonly used dictionaries should be interpreted as having a meaning consistent with the meaning in the context of the related art, and unless explicitly defined in this application, they are not interpreted in an ideal or excessively formal meaning.

As used herein, the term "precursor" is used to comprehensively refer to a compound including a specific metal to provide the specific metal included in an electrode active material.

FIG. 1 is a schematic flow diagram for describing a method for recovering an active metal of a lithium secondary battery in accordance with an exemplary embodiment.

Referring to FIG. 1, a preliminary cathode active material mixture 50 (a waste cathode active material mixture) may be prepared from a waste cathode of a lithium secondary battery (e.g., in a process of S10).

The lithium secondary battery may include an electrode assembly including a cathode, an anode and a separation layer interposed between the cathode and the anode. The cathode and the anode may include a cathode active material layer and an anode active material layer coated on a cathode current collector and an anode current collector, respectively.

For example, the cathode active material included in the cathode active material layer may include an oxide containing lithium and a transition metal.

In some embodiments, the cathode active material may include a compound represented by Formula 1 below.

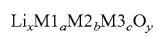   [Chemical Formula 1]

In Chemical Formula 1, M1, M2 and M3 may include a transition metal selected from Ni, Co, Mn, Na, Mg, Ca, Ti, V, Cr, Cu, Zn, Ge, Sr, Ag, Ba, Zr, Nb, Mo, Al, Ga or B. In Chemical Formula 1, $0<x\leq1.1$, $2\leq y\leq2.02$, $0<a<1$, $0<b<1$, $0<c<1$, and $0<a+b+c\leq1$.

In some embodiments, the cathode active material may be a nickel-cobalt-manganese (NCM)-based lithium oxide.

The waste cathode may be recovered by separating the cathode from a waste lithium secondary battery. The waste cathode may include the cathode current collector (e.g., aluminum (Al)) and the cathode active material layer as described above, and the cathode active material layer may include a conductive material and a binder together with the cathode active material as described above.

The conductive material may include, e.g., a carbon-based material such as graphite, carbon black, graphene, carbon nanotube, etc. The binder may include a resin material, e.g., vinylidenefluoride-hexafluoropropylene copolymer (PVDF-co-HFP), polyvinylidenefluoride (PVDF), polyacrylonitrile, polymethylmethacrylate, etc.

In one or more exemplary embodiments, the recovered waste cathode may be pulverized to produce the preliminary cathode active material mixture 50. Accordingly, the preliminary cathode active material mixture 50 may be prepared in a powder form. As described above, the preliminary cathode active material mixture 50 may include a powder of the lithium-transition metal oxide, e.g., a powder of the NCM-based lithium oxide (e.g., $Li(NCM)O_2$), a powder of the binder and a powder of the conductive material.

The term "preliminary cathode active material mixture" used in the present application may refer to a raw material that is input to a fluidizing process using an oxygen-containing gas to be described later after the cathode current collector is substantially removed from the waste cathode. In an embodiment, the preliminary cathode active material mixture 50 may include cathode active material particles such as the NCM-based lithium oxide. In an embodiment, the preliminary cathode active material mixture 50 may include a portion of components derived from the binder 70 or the conductive material 80.

In some embodiments, an average particle diameter (D50) of the preliminary cathode active material mixture may be from 5 to 100 μm. Within the above range, a lithium-transition metal oxide such as $Li(NCM)O_2$ to be recovered may be easily separated from the cathode current collector, the binder 70 and the conductive material 80 included in the preliminary cathode active material mixture 50.

In some embodiments, the cathode active material mixture may be heat-treated before being pulverized. Accordingly, detachment of the cathode current collector may be promoted during the pulverization, and the binder 70 and the conductive material 80 may be at least partially removed. A temperature of the heat treatment may be, e.g., from about 100 to 500° C., preferably from about 350 to 450° C.

In some embodiments, the preliminary cathode active material mixture 50 may be obtained after immersing the recovered cathode in an organic solvent. For example, the recovered cathode may be immersed in the organic solvent to separate and remove the cathode current collector, and the preliminary cathode active material mixture 50 including cathode active material particles, the binder and the conductive material may be selectively extracted through a centrifugation.

Through the above-described processes, components of the cathode current collector such as aluminum may be substantially completely separated and removed, and the preliminary cathode active material mixture 50 in which a content of carbon-based components derived from the binder 70 and/or the conductive material 80 is reduced may be obtained.

The preliminary cathode active material mixture 50 may be fluidized by injecting an oxygen-containing gas into a fluidized bed reactor 100 to form a cathode active material mixture 90 (e.g., in a process S20).

The term "fluidized bed reactor" used in this application may refer to a reactor in which a fluid (gas or liquid) is passed through the injected preliminary cathode active material mixture 50 to induce a fluidization of the preliminary cathode active material mixture 50. For example, the fluid may be the oxygen-containing gas to be described later.

In one or more exemplary embodiments, the preliminary cathode active material mixture 50 including the cathode active material particles 60, the binder 70 and the conductive material 80 may be injected into the fluidized bed reactor 100.

For example, the preliminary cathode active material mixture 50 may be injected into the fluidized bed reactor 100 through an upper inlet 108a located at an upper portion of the fluidized bed reactor 100.

In exemplary embodiments, the oxygen-containing gas may be injected into the fluidized bed reactor 100.

The oxygen-containing gas may be injected into a reactor body 110 of the fluidized bed reactor 100 through a gas inlet 104 located at a lower portion of the fluidized bed reactor 100.

In exemplary embodiments, the oxygen-containing gas may be a mixture of oxygen ($O_2$) and a non-reactive gas. The non-reactive gas may include at least one selected from the group consisting of helium (He), nitrogen ($N_2$), neon (Ne), argon (Ar), krypton (Kr) and xenon (Xe).

For example, a volume ratio of oxygen relative to a total volume of the oxygen-containing gas may be in a range from 10 to 30 vol %, and a volume ratio of the non-reactive gas may be in a range from 70 to 90 vol %.

As the oxygen-containing gas is injected into the fluidized bed reactor 100, the preliminary cathode active material mixture 50 injected into the fluidized bed reactor 100 may be fluidized.

For example, the fluidized bed reactor 100 may include an expanded portion 120 having a larger diameter than that of the reactor body 110 at a top portion thereof. The expanded portion 120 may have the diameter larger than that of the reactor body 110 to reduce a flow rate of the oxygen-containing gas that is injected from the lower portion of the fluidized bed reactor 100 and rises. Thus, a decrease of a recovery ratio due to a leakage of the preliminary cathode active material mixture 50 to an outside of the reactor body 110 caused when the injection rate of the oxygen-containing gas increases may be effectively prevented.

In exemplary embodiments, the fluidizing of the preliminary cathode active material mixture 50 through the oxygen-containing gas may further include decomposing or combusting the binder and the conductive material by a heat-treatment in the fluidized bed reactor. For example, the conductive material 80 may react with oxygen contained in the oxygen-containing gas to be combusted into carbon monoxide (CO) or carbon dioxide ($CO_2$) to be removed.

Thus, generation of carbon-derived by-products (e.g., lithium carbonate) in a hydrogen reductive process to be described later may be decreased. In this case, for example, a content of lithium hydroxide in a preliminary lithium precursor may be increased to increase the recovery ratio of the lithium precursor. Further, a subsequent process for, e.g., removing the by-products may not be needed, so that process productivity and long-term operational ability may be improved.

For example, a decomposition ratio of the binder 70 by the heat-treatment may be 95% or more, preferably 99% or more.

For example, a combustion ratio of the conductive material 80 by the heat-treatment may be 95% or more, preferably 99% or more.

In one or more embodiments, the binder 70 and the conductive material 80 may be simultaneously decomposed or combusted by the fluidization heat-treatment as described above.

In one or more exemplary embodiments, a temperature of the heat treatment may be in a range from 100 to 600° C., more preferably from at about 400 to 600° C. In this case, the fluidized bed reactor 100 may include a heating tool capable of adjusting the temperature at an inside of the reactor body 110.

In the above temperature range, for example, decomposition of the binder 70 and combustion of the conductive material 80 may be initiated.

For example, when the heat treatment temperature is within the above range, remaining ratios of the binder 70 and the conductive material 80 in a cathode active material mixture 90 may be remarkably reduced.

For example, if the binder 70 remains in the cathode active material mixture 90, excessive reduction may occur due to, e.g., a decomposition heat of the binder 70 in a hydrogen reductive process to be described later, and particles may aggregate, thereby deteriorating the recovery ratio of the lithium precursor.

For example, if the conductive material 80 remains in the cathode active material mixture 90, the content of the carbon-derived by-products such as lithium carbonate ($Li_2CO_3$) may increase in the hydrogen reduction process to be described later, and process stability and the recovery ratio of the lithium precursor may be lowered. In this case, the subsequent process (e.g., a filtration process) for removing the carbon-derived by-products may be added to degrade productivity and process stability of the method for recovering active metals of a lithium secondary battery.

In one or more embodiments, if the temperature of the heat-treatment exceeds 600° C., lithium carbonate may be formed by a side reaction (e.g., an excessive reduction by carbon), and the particles may be aggregated. In this case, the reduction ratio of the cathode active material particles may be decreased, and the recovery ratio of the lithium precursor may be lowered.

In exemplary embodiments, the fluidizing the preliminary cathode active material mixture 50 by the oxygen-containing gas may include heating, in which a heating temperature is raised from a temperature of less than 50° C. to a target temperature in a range from 400 to 600° C. for 1 to 2 hours.

In this case, for example, a heat-treatment at the target temperature for 2 to 5 hours may be further included.

In some exemplary embodiments, the binder 70 may be decomposed and the conductive material 80 may be combusted through the heat-treatment. A temperature increase in the fluidized bed reactor 100 due to the decomposition of the binder 70 and the combustion of the conductive material 80 may be about 50° C. or less, preferably about 30° C. or less. It is advantageous that a lower limit of the temperature increase is as small as possible, but the lower limit may be about 1° C. or more.

The decomposition of the binder 70 and the combustion of the conductive material 80 may be performed at the inside the fluidized bed reactor 100, and thus the decomposition heat of the binder 70 and the combustion heat of the conductive material 80 may be dispersed throughout the preliminary cathode active material mixture 50. Thus, the temperature increase due to the decomposition heat and the combustion heat may be minimized. Accordingly, melting and aggregation of the particles due to the side reaction (e.g., the excessive reductive reaction due to the decomposition heat and combustion heat) of the preliminary cathode active material mixture 50 may be suppressed, and a reduction ratio of the hydrogen reductive process may be enhanced.

In some embodiments, an average diameter of the cathode active material mixture 90 may be in a range from about 1 and 100 μm. Within this range, a contact area between a reductive gas and the cathode active material mixture 90 may be increased during the reductive process to be described later, and the recovery ratio of the lithium precursor may be increased.

In some exemplary embodiments, the particle size distribution of the cathode active material mixture 90 may be greater than about 0 μm and less than about 500 μm.

For example, within the rage of the particle size distribution, the cathode active material mixture 90 may be uniformly reduced as a whole. Accordingly, a heat generated during the reductive reaction is uniformly distributed throughout the cathode active material mixture 90, and side reactions caused by the heat generated during the reductive reaction may be minimized. Accordingly, the recovery ratio of the lithium precursor may be improved.

In a comparative example, the decomposition and combustion of the binder 70 and the conductive material 80 by the heat-treatment may be performed in a non-fluidized reactor. However, in the non-fluidized reactor, the decomposition heat of the binder 70 and the combustion heat of the conductive material 80 are not dispersed throughout the reactor, and the above-mentioned side reaction may occur due to the temperature increase due to concentration of the decomposition heat and combustion heat to cause melting and agglomeration of the particles included in the preliminary cathode active material mixture 50.

In this case, a diameter of the particles included in the preliminary cathode active material mixture 50 may be increased to 1 cm or more. As a result, re-fluidization of the preliminary cathode active material mixture 50 for performing the reductive reaction described later may not be possible, and thus process efficiency of the reductive reaction described later may be degraded and the recovery ratio of the lithium precursor may be decreased.

In a comparative Example, the preliminary cathode active material mixture 50 may be prepared by a heat-treatment in a separate combustion furnace instead of the fluidized bed reactor 100. However, in this case, metal particles included in the cathode active material mixture 90 (e.g., Ni and Co) may be agglomerated. When the reductive process to be described later is performed by introducing the agglomerated particles, the reductive ratio may be decreased and the recovery ratio of the lithium precursor may also be decreased.

In exemplary embodiments, the cathode active material mixture 90 formed according to the process S20 may be collected through an outlet 108b of the fluidized bed reactor 100. The collected cathode active material mixture 90 may be injected into the hydrogen reductive process to be described later.

In exemplary embodiments, a preliminary precursor mixture including preliminary lithium precursor particles and transition metal-containing particles may be formed by reducing the cathode active material mixture 90 (e.g., in a process S30).

For example, the transition metal-containing particles may include Ni, Co, NiO, CoO and MnO.

For example, the preliminary lithium precursor particle may include at least one of lithium hydroxide (LiOH), lithium oxide ($Li_2O$) and lithium carbonate ($Li_2CO_3$). From an aspect of charge/discharge properties, life-span properties and high-temperature stability of the lithium secondary battery, the preliminary lithium precursor particle may include lithium hydroxide.

In exemplary embodiments, fluidizing the preliminary cathode active material mixture 50 by the oxygen-containing gas and forming the preliminary precursor mixture may be continuously performed in-situ at the inside of the fluidized bed reactor 100. In this case, the formation of the cathode active material mixture 90 and the reductive reaction may be performed in the same reactor, so that a partial loss of the cathode active material mixture 90 during transport of the cathode active material mixture 90 may be prevented. Accordingly, the recovery ratio of the lithium precursor may be further improved.

The cathode active material mixture 90 may be reduced by a reductive gas injected into the reactor body 110 through the gas inlet 104 located at the lower portion of the fluidized bed reactor 100 to form the preliminary precursor mixture.

A mixed gas of hydrogen and a non-reactive gas may be injected as the reductive gas. A volume ratio of hydrogen based on a total volume of the mixed gas may be in a range from 5 to 40%, and a volume ratio of the non-reactive gas may be in a range from 60 to 95%, based on the total volume of the mixed gas.

The hydrogen reductive reaction may be performed at a temperature from about 300 to 700° C., preferably from 400 to 500° C. A yield of the preliminary precursor mixture produced from the cathode active material mixture 90 may be improved in the above temperature range.

In some embodiments, an additional temperature increase of the fluidized bed reactor 100 by the hydrogen reductive reaction may be about 10° C. or less, and preferably about 5° C. or less. A lower limit of the additional temperature increase is not particularly limited, but may be about 1° C. or more.

For example, the cathode active material mixture 90 may not substantially include the binder. In this case, the temperature increase at the inside of the fluidized bed reactor 100 due to the decomposition heat of the binder may be suppressed. Therefore, excessive reduction of the cathode active material mixture 90 due to the decomposition heat may be prevented, thereby preventing aggregation of particles due to a bond between nickel (Ni) and cobalt (Co) included in the cathode active material mixture 90. Additionally, the preliminary precursor mixture formed by reducing the cathode active material mixture 90 may be more easily collected in a slurry state.

For example, the cathode active material mixture 90 may not substantially include the conductive material 80, and the content of the by-product (e.g., lithium carbonate) formed by a reductive reaction by carbon may be reduced. In this case, a mixing content of lithium hydroxide having high solubility to a leachate in the preliminary precursor mixture may be increased, and thus the recovery ratio of the lithium precursor may be increased in a lithium precursor recovery to be described later.

In some embodiments, the cathode active material mixture 90 may not substantially include the conductive material 80, so that a reaction heat generated by the reductive reaction of carbon may be reduced. In this case, the temperature increase due to the reductive reaction may be lowered.

In an exemplary embodiment, water and a non-reactive gas may be injected into the fluidized bed reactor 100 to form the preliminary precursor mixture into a slurry state before collecting the formed preliminary precursor mixture. In this case, the aggregation of the preliminary precursor mixture by the hydrogen reductive reaction may be eliminated, and the preliminary precursor mixture may be more easily collected in the slurry state.

For example, water may be injected into the fluidized bed reactor 100 through an upper inlet 108*a* of the fluidized bed reactor 100, and the non-reactive gas may pass through the gas inlet 104 located at the lower portion of the fluidized bed reactor 100 to be injected into the fluidized bed reactor 100.

For example, the preliminary precursor mixture in the slurry state may be collected through an outlet 108*b* located at the lower portion of the fluidized bed reactor 100. The collected preliminary precursor mixture may be provided for a lithium precursor collection process to be described later.

In some embodiments, the formed preliminary precursor mixture may not be separately collected from the fluidized bed reactor 100 so that the formed preliminary precursor mixture may be located at the inside of the fluidized bed reactor 100, and the lithium precursor collection process to be described later may be performed at the inside the fluidized bed reactor 100. In this case, a partial loss of the preliminary precursor mixture in the process of transporting the formed preliminary precursor mixture may be prevented. Thus, the recovery ratio of the lithium precursor may be further improved.

In exemplary embodiments, the lithium precursor may be collected from the preliminary precursor mixture (e.g., in a process S40).

For example, the lithium precursor may be collected by reacting the preliminary precursor mixture formed from the hydrogen reductive reaction with a leaching solution.

For example, the preliminary precursor mixture may react with the leaching solution to form a solution in which the lithium precursor may be dissolved and the transition metal precursor may be precipitated.

For example, lithium oxide may react with the leaching solution to form lithium hydroxide, and lithium hydroxide may be dissolved in the leaching solution.

In some embodiments, the leaching solution may include water. In this case, the preliminary precursor mixture may be washed with water. Through the water-washing treatment, the preliminary precursor mixture and water may react to form the lithium precursor in which lithium hydroxide is dissolved in water.

In some exemplary embodiments, the leaching solution may further include dimethyl carbonate or diethyl carbonate.

For example, dimethyl carbonate or diethyl carbonate may promote the reaction of the preliminary precursor mixture with water. Accordingly, separation efficiency of the lithium precursor may be improved.

In some embodiments, the precipitate may include a slurry including the preliminary precursor mixture.

For example, transition metal-containing particles insoluble in the leaching solution may be dispersed in the leaching solution to form the slurry. Accordingly, the lithium precursor may be collected by separating the slurry from the solution in which the lithium precursor is dissolved.

In some embodiments, the precipitated transition metal-containing particles may be collected to form a transition metal precursor. For example, the transition metal-containing particles may react with an acid solution to form the transition metal precursor.

In exemplary embodiments, sulfuric acid may be used as the acid solution. In this case, the transition metal precursor may include a transition metal sulfate. For example, the transition metal sulfate may include $NiSO_4$, $MnSO_4$ and $CoSO_4$.

The reaction of the preliminary precursor mixture and the leaching solution may be performed at the inside of the fluidized bed reactor 100 where the process of forming the cathode active material mixture 90 is performed. In this case, separate collection of each product after the formation process of the cathode active material mixture 90, the hydrogen reduction process or the formation process of the preliminary precursor mixture may not be required, so that reduction of the recovery ratio of the lithium precursor which may occur in the process of transporting each product may be minimized.

Figure 2:
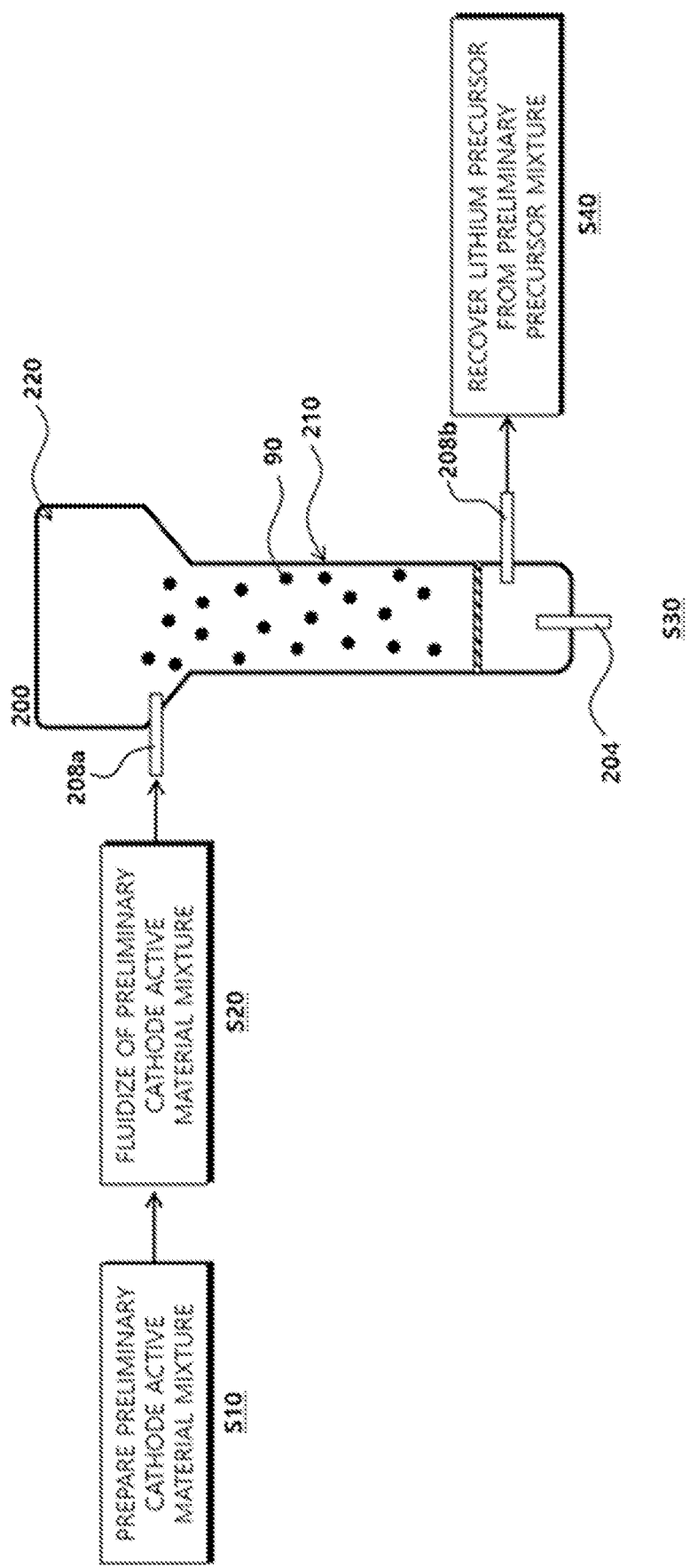
FIG. 2 is a schematic flow diagram for describing a method for recovering an active metal of a lithium secondary battery in accordance with some exemplary embodiments.

FIG. 2 is a schematic flow diagram for describing a method for recovering an active metal of a lithium secondary battery in accordance with some exemplary embodiments.

Referring to FIG. 2, in another embodiment, the cathode active material mixture 90 formed by fluidizing the preliminary cathode active material mixture 50 may be collected through the gas inlet 104 located at the lower portion of the fluidized bed reactor 100, and the collected cathode active material mixture 90 may be introduced into a separate reductive reactor 200 to perform the above-described reductive process.

For example, the cathode active material mixture 90 may be injected into a reductive reactor 200 through an upper inlet 208*a* located at an upper portion of the reductive reactor 200, and hydrogen may be injected into a reactor body 210 through a gas inlet 204 located at a lower portion of the reductive reactor 200.

For example, an expanded portion 220 may be located at a top portion of the reductive reactor 200. A flow rate of the reductive gas injected from the lower portion of the reductive reactor 200 may be lowered so that a leakage of the cathode active material mixture 90 to an outside caused when re-fluidizing the cathode active material mixture 90 located in the reductive reactor 200 may be effectively prevented.

In some embodiments, water and a non-reactive gas may be injected into the reduction reactor 200 to form the preliminary precursor mixture into a slurry state before collecting the preliminary precursor mixture. In this case, aggregation of the preliminary precursor mixture by the reductive reaction may be resolved, and the preliminary precursor mixture may be more easily collected in the slurry state.

For example, water may be injected into the reductive reactor 200 through an upper inlet 208*a* of the reductive reactor 200, and the non-reactive gas may be injected through a gas inlet 204 located at the lower portion of the reductive reactor 200 into the reductive reactor 200.

For example, the preliminary precursor mixture in the slurry state may be collected through an outlet 208b located at the lower portion of the reductive reactor 200. The collected preliminary precursor mixture may be injected into the above-described lithium precursor collection process.

In an embodiment, the formed preliminary precursor mixture may not be separately collected from the reductive reactor 200, and may be located at the inside of the reductive reactor 200 so that the above-described lithium precursor collection process may be performed at the inside of the reductive reactor 200.

In this case, separately collection of each product after performing the process of forming the preliminary precursor mixture may not be required, so that decrease of the recovery ratio of the lithium precursor that may be caused in the process of transporting each product may be prevented.

Hereinafter, experimental examples including specific examples and comparative examples are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

Example 1

1 kg of a cathode material separated from a waste lithium secondary battery was cut into small units and pulverized through a milling to obtain a preliminary cathode active material mixture including a Li—Ni—Co—Mn oxide, a binder (polyvinylidene fluoride, PVDF) and a conductive material (carbon black) (S10 process).

0.2 kg of the collected preliminary cathode active material mixture was injected into a fluidized bed reactor, and a mixed gas of 20 vol % oxygen/80 vol % nitrogen was injected into a bottom of the fluidized bed reactor to fluidize the preliminary cathode active material mixture to form a cathode active material mixture. An internal temperature of the fluidized bed reactor was increased from 20° C. to 500° C., and the temperature was maintained at 500° for 3 hours to thermally decompose the binder included in the preliminary cathode active material mixture and remove the conductive material by a combustion (S20 process).

A mixed gas of 20 vol % hydrogen/80 vol % nitrogen was injected for 4 hours through a gas inlet located at the bottom of the fluidized bed reactor to proceed with a fluidization and a reaction with hydrogen in the fluidized bed reactor to form a preliminary precursor mixture containing lithium hydroxide. A temperature at the inside of the fluidized bed reactor was maintained at 460° C. during the process (S30 process).

Water and nitrogen gas were introduced into the formed preliminary precursor mixture to form a slurry state preliminary precursor mixture. The preliminary precursor mixture in the slurry state was collected, water was additionally added, and then washed with water to obtain an aqueous lithium precursor solution (S40 process).

Example 2

A lithium precursor aqueous solution was obtained by the same method as that in Example 1, except that, in the heat-treatment process of the preliminary cathode active material mixture for the preparation of the cathode active material mixture, the temperature was set to 650° C.

Comparative Example 1

A lithium precursor aqueous solution was obtained by the same method as that in Example 1, except that the preliminary cathode active material mixture was not subjected to the heat-treatment when preparing the cathode active material mixture.

Comparative Example 2

A lithium precursor aqueous solution was obtained by the same method as that in Example 1, except that the heat-treatment process of the preliminary cathode active material mixture for the preparation of the cathode active material mixture was performed using a separate combustion furnace that was not a fluidized reactor, and then the resulting cathode active material mixture was put into the fluidized bed reactor to perform the hydrogen reductive reaction.

Comparative Example 3

A lithium precursor aqueous solution was obtained by the same method as that in Example 1, except that, in the heat-treatment process of the preliminary cathode active material mixture for the preparation of the cathode active material mixture, only nitrogen gas (non-reactive gas) that did not include an oxygen gas as the oxygen-containing gas was used for the fluidization.

Experimental Example (1) Measurement of Temperature Change Deviation

An temperature at the inside of the fluidized bed reactor was measured to calculate a deviation between minimum and maximum temperatures during the reaction.

(2) Measurement of Average Diameter

A diameter of the particles of the cathode active material mixture was measured using a Malvern laser light diffraction/scattering device, Mastersizer 3000.

(3) Measurement of Particle Size Distribution Range

The cathode active material mixture particles were sufficiently dispersed in an aqueous medium by an ultrasonic treatment, and measurement using a Malvern laser light diffraction/scattering device, Mastersizer 3000 was performed.

(4) Measurement of Binder Removal Ratio

A binder removal ratio was measured by measuring a mass of the binder included in the cathode active material mixture relative to a mass of the binder included in the preliminary cathode active material mixture.

(5) Measurement of Conductive Material Removal Ratio

The conductive material removal ratio was measured by measuring a mass of the conductive material included in the cathode active material mixture relative to a mass of the conductive material included in the preliminary cathode active material mixture.

(6) Evaluation on Lithium Carbonate ($Li_2CO_3$) Generation

Water was additionally added by 19 times (based on a weight) to the obtained aqueous solution of the preliminary precursor mixture in the slurry state and stirred, and then a weight of carbonate ions dissolved in water was measured to evaluate the generation of lithium carbonate.

(7) Measurement of Lithium Precursor Recovery Ratio

Water was additionally added by 19 times (based on a weight) to the obtained aqueous solution of the preliminary precursor mixture in the slurry state and stirred, and then the lithium precursor in which lithium hydroxide and lithium carbonate were dissolved in water was recovered. A weight of lithium dissolved in water relative to a weight of lithium in the initial cathode active material sample was measured to calculate a lithium precursor recovery ratio.

(8) Measurement of Lithium Carbonate ($Li_2CO_3$) Selectivity

Water was additionally added by 19 times (based on a weight) to the obtained aqueous solution of the preliminary precursor mixture in the slurry state and stirred. A weight of carbonate ions dissolved in water was measured, and then a generation ratio of lithium carbonate in the recovered lithium precursor was calculated.

The maximum deviation of the internal temperature change of the fluidized bed reactor measured during the preparation process of the cathode active material mixture, the average diameter of the formed cathode active material mixture particles, the particle size distribution, the binder removal ratio, the conductive material removal ratio, the formation of by-products ($Li_2CO_3$) and the selectivity of lithium carbonate in the above-described Examples and Comparative Examples are shown in Table 1.

Additionally, a maximum deviation of the temperature change at the inside of the reductive reactor during the reduction process and a lithium recovery ratio after washing with water were measured and shown in Table 1.

TABLE 1

| category | | Example 1 | Example 2 | Comparative Example 1 | Comparative Example 2 | Comparative Example 3 |
|---|---|---|---|---|---|---|
| Fluidization process (S20) | deviation of temperature change (° C.) | 30 | 50 | — | 300 | 20 |
| | average diameter (μm) | 13 | 13 | 70 | 50000 | 15 |
| | particle size distribution range (μm) | 0~300 | 0~300 | 0~300 | 0~50000 | 0~300 |
| | binder removal ratio (%) | 99 | 99 | 0 | 30 | 95 |
| | conductive material removal ratio (%) | 99 | 99 | 0 | 10 | 20 |
| Reductive process (S30) | deviation of temperature change (° C.) | 5 | 5 | 130 | — | 25 |
| | $Li_2CO_3$ generation | X | ○ | ○ | ○ | ○ |
| Recovery process of lithium precursor | recovery ratio of lithium precursor (%) | 90 | 88 | 55 | 10 | 85 |
| | LiOH | 100 | 93 | 74 | 69 | 83 |
| (S40) | selectivity (%) $Li_2CO_3$ selectivity (%) | 0 | 7 | 26 | 31 | 17 |

Referring to Table 1, in Example 1 where the fluidization heat treatment process was performed to remove the binder and the conductive material included in the preliminary cathode active material mixture, improved lithium precursor recovery ratio was achieved and generation of by-products such as lithium carbonate were suppressed in the reductive process.

In Example 2 where the heat-treatment process for preparing the cathode active material mixture was performed at 650° C., lithium carbonate as a by-product was generated due to a side reaction at high temperature, and the recovery ratio of the lithium precursor in the lithium precursor recovery process was reduced.

However, in Comparative Example 1 where the thermal decomposition process was not performed, a side reaction (e.g., an excessive reductive reaction of the cathode active material mixture) occurred due to a decomposition heat by the decomposition of the binder during the hydrogen reductive process, and the prepared metal active material mixture was agglomerated. Accordingly, the over-reduced metal active material mixture could not be easily transformed into a slurry state. As a result, the recovery ratio of the lithium precursor was degraded.

In Comparative Example 2 where the non-fluidization heat treatment process was performed in a separate furnace before the reductive process, the cathode active material mixture was agglomerated due to a side reaction (e.g., an excessive reduction) in the thermal decomposition process to form aggregates having a diameter of 5 cm. Accordingly, the cathode active material mixture could not be easily fluidized, and the reduction ratio of the hydrogen reductive process was decreased. As a result, the recovery ratio of the lithium precursor was degraded.

In Comparative Example 3 where only the non-reactive gas ($N_2$ gas) devoid of oxygen was injected as the oxygen-containing gas, the conductive material was not removed, and lithium carbonate as the by-product was generated in the hydrogen reductive process. Accordingly, the mixing content of lithium hydroxide in the preliminary precursor mixture was lowered, and the recovery ratio of the lithium precursor was slightly lowered. Further, lithium carbonate was not dissolved in the leaching solution, and a separate subsequent filtration process was required. As a result, economic feasibility and long-term operability of the process were deteriorated.

The conductive material was not removed in Comparative Examples 1 and 2, lithium carbonate was generated as the by-product, resulting in the reduction of the recovery ratio of the lithium precursor and degradation of the economic feasibility and long-term operability of the process as in Comparative Example 3.

What is claimed is:
1. A method for recovering an active metal of a lithium secondary battery, the method comprising:

preparing a preliminary cathode active material mixture from a cathode of a waste lithium secondary battery;

fluidizing the preliminary cathode active material mixture by an oxygen-containing gas in a fluidized bed reactor to form a cathode active material mixture;

forming a preliminary precursor mixture from the cathode active material mixture by injecting a reductive gas into the fluidized bed reactor; and recovering a lithium precursor from the preliminary precursor mixture.

2. The method of claim 1, wherein the cathode comprises a cathode current collector, and a cathode active material layer formed on the cathode current collector, and the cathode active material layer comprises a binder, a conductive material and a cathode active material, wherein the preparing of the preliminary cathode active material mixture comprises removing the cathode current collector from the cathode; and the preliminary cathode active material mixture comprises the binder, the conductive material and the cathode active material.

3. The method of claim 2, wherein the fluidizing of the preliminary cathode active material mixture by the oxygen-containing gas comprises decomposing and/or combusting the binder and the conductive material in the fluidized bed reactor.

4. The method of claim 1, wherein the oxygen-containing gas includes oxygen ($O_2$) and a non-reactive gas selected from the group consisting of helium (He), nitrogen ($N_2$), neon (Ne), argon (Ar), krypton (Kr), xenon (Xe), and a combination thereof.

5. The method of claim 4, wherein a volume ratio of the oxygen is in a range from 10 to 30 vol %, and a volume ratio of the non-reactive gas is in a range from 70 to 90 vol % based on a total volume of the oxygen-containing gas.

6. The method of claim 1, wherein the fluidizing of the preliminary cathode active material mixture by the oxygen-containing gas is performed at a temperature from 100 to 600° C.

7. The method of claim 6, wherein the fluidizing of the preliminary cathode active material mixture by the oxygen-containing gas comprises heating an inside of the fluidized bed reactor from a temperature less than 50° C. for 1 to 2 hours so that a temperature of the inside of the fluidized bed reactor reaches a target temperature in a range from 400 to 600° C.

8. The method of claim 7, wherein the fluidizing of the preliminary cathode active material mixture by the oxygen-containing gas further comprises, subsequent to reaching the target temperature, performing a heat treatment at the target temperature for 2 to 5 hours.

9. The method of claim 1, wherein the reductive gas comprises hydrogen.

10. The method of claim 9, wherein the forming of the preliminary precursor mixture is performed at a temperature in a range from 400 to 500° C.

11. The method of claim 9, wherein the fluidizing of the preliminary cathode active material mixture by the oxygen-containing gas and the forming of the preliminary precursor mixture are continuously performed in-situ in the fluidized bed reactor.

12. The method of claim 9, wherein the preliminary precursor mixture includes preliminary lithium precursor particles and transition metal-containing particles including Ni, Co, NiO, CoO and MnO.

13. The method of claim 12, wherein the preliminary lithium precursor particles include at least one of lithium hydroxide, lithium oxide and lithium carbonate.

14. The method of claim 13, wherein the recovering of the lithium precursor comprises collecting the lithium hydroxide by washing the preliminary lithium precursor particles with water.

15. The method of claim 1, wherein the fluidizing of the preliminary cathode active material mixture and the forming of the preliminary precursor mixture are performed in different fluidized bed reactors.

16. The method of claim 1, further comprising, after forming of the preliminary precursor mixture:

forming the preliminary precursor mixture in a slurry state by injecting water and a non-reactive gas.

17. The method of claim 1, wherein the recovering of the lithium precursor from the preliminary precursor mixture comprises reacting the preliminary precursor mixture with a leaching solution comprising water.

18. The method of claim 17, wherein the leaching solution further comprises at least one of dimethyl carbonate and diethyl carbonate.

* * * * *